United States Patent
Takahashi et al.

(10) Patent No.: US 6,954,017 B2
(45) Date of Patent: Oct. 11, 2005

(54) MOTOR

(75) Inventors: Shuji Takahashi, Kyoto (JP); Shinichi Murata, Kyoto (JP); Tomoyuki Inoue, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/710,341

(22) Filed: Jul. 2, 2004

(65) Prior Publication Data

US 2005/0001495 A1 Jan. 6, 2005

(30) Foreign Application Priority Data

Jul. 2, 2003 (JP) ........................................ 2003-190328

(51) Int. Cl.$^7$ .......................... H02K 5/10; H02K 11/00; H02K 41/00; F04B 35/04

(52) U.S. Cl. ........................ 310/85; 310/67 R; 310/90; 360/99.07; 360/99.08; 360/99.09; 360/99.11; 417/423.1; 417/423.12

(58) Field of Search .................. 310/90, 85; 417/423.1, 417/423.3, 423.5, 423.7, 423.12–423.14, 424.1

(56) References Cited

U.S. PATENT DOCUMENTS

| 5,490,021 | A | * | 2/1996 | Muller et al. | ............ | 360/98.07 |
| 6,084,328 | A | | 7/2000 | Yamashita et al. | | |
| 6,242,830 | B1 | * | 6/2001 | Katagiri | ........................ | 310/90 |
| 6,717,310 | B2 | * | 4/2004 | Yoshikawa et al. | ........... | 310/90 |
| 6,781,268 | B2 | * | 8/2004 | Oku | ............................ | 310/90 |
| 2004/0052662 | A1 | | 3/2004 | Hasiang et al. | | |
| 2004/0135447 | A1 | * | 7/2004 | Lee et al. | ...................... | 310/90 |

FOREIGN PATENT DOCUMENTS

| JP | 5-130754 | * | 5/1993 | .................. | 310/90 |
| JP | 2000-14080 A | | 1/2000 | | |

* cited by examiner

Primary Examiner—Tran Nguyen
(74) Attorney, Agent, or Firm—Shinjyu Global IP

(57) ABSTRACT

A motor of this invention is provided with a sleeve-type bearing impregnated with oil for supporting a rotor assembly including a shaft and a rotor member. A lower face of the rotor is provided with at least two peripheral wall portions, an inner peripheral wall portion and an outer peripheral wall portion, which surround the shaft with a gap therebetween in a radial direction. The peripheral wall portions are accommodated in an annular recessed portion so as to surround an open space over a sleeve constituted the sleeve-type bearing and has a lower top of the most inner part. The lower end of the inner peripheral wall portion is located lower than the lower end of the outer peripheral wall portion, and the lower end of the outer peripheral wall portion is located lower than the lower top of the annular recessed portion.

9 Claims, 11 Drawing Sheets

MOTOR

CROSS REFERENCE TO RELATED APPLICATIONS

The disclosure of Japanese Patent Application No. 2003-190328 filed Jul. 2, 2003 including specification, drawings and claims is incorporated herein by reference in its entirety.

BACKGROUND OF INVENTION

1. Field of the Invention

The present invention relates to a motor in which a sleeve-type bearing impregnated with oil is used.

2. Description of the Related Art

As shown in FIG. 10, a conventional motor in which a sleeve-type bearing is used is constituted such that a sleeve 2 impregnated with oil is fitted and fixed inside a cylindrical portion 1a of a housing 1 with a bottom and a shaft 3 is rotatably supported by the sleeve 2. The sleeve 2 is provided as a porous body made of a sintered metal impregnated with oil. A stator 4 is fitted and fixed to an outer peripheral face of the cylindrical portion 1a. A rotor 5 made of synthetic resin and injection-molded is integrally fixed to an upper end of the shaft 3. A magnet 7 is fixed inside the rotor 5 so as to be opposed to the stator 4 via a back iron 6 made of magnetic material. When electric current flows in the stator 4, rotational magnetic field is induced, so that the rotor 5 is rotated due to influence of magnetic interaction together with magnetic field of the magnet 7.

In the motor, lubrication oil oozed out of the sleeve 2 during rotation of the motor goes along a coupling portion 5a of the rotor 5 from an outer peripheral face of the shaft 3, and passes through a lower face of an inner side of the rotor 5 to leak outside the rotor through a clearance between the rotor 5 and an outer peripheral face of the back iron 6 (refer to arrow in FIG. 10).

As means for preventing such lubrication oil leakage, as shown in FIG. 11, a constitution that a lower end portion of the coupling portion 5a of the rotor 5 is received in an annular space defined by an inner peripheral face of the housing 1 and an upper end face of the sleeve 2, and an annular groove 9 is provided on an lower end face of the coupling portion 5a about the center axis of the shaft 3 has been known. With this constitution, since lubrication oil which has reached the coupling portion is captured in the annular groove 9, further advancing thereof is blocked. Such a technical idea has been disclosed in, for example, US2004/0052662A1 (FIG. 2) and U.S. Pat. No. 6,318,976B1.

In the means for preventing lubrication oil leakage, however, lubrication oil is temporarily captured in the annular groove 9, but the lubrication oil rides over a peripheral wall of the annular groove 9 on an outer diametrical side due to a time elapsing and such an action as a centrifugal force during rotation to reach an outer side peripheral face of the coupling portion 5a. As a result, the lubrication oil flows through an inner face of the rotor to leak outside of the rotor. Thus, the conventional motor has not been applied with sufficient means for preventing lubrication oil leakage.

SUMMARY OF INVENTION

An object of the present invention is to prevent lubrication oil in a sleeve impregnated with oil from leaking outside a rotor in a motor in which the sleeve-type bearing is used.

According to one aspect of the present invention, there is provided the motor in which at least two peripheral wall portions, an outer peripheral wall portion and an inner peripheral wall portion, are provided on an inner side face of the rotor such that the peripheral wall portions surround a shaft so as to be spaced from the shaft in a radial direction and both the peripheral wall portions are spaced each other in radial direction. An annular recessed portion is located in outer peripheral location of the outer peripheral wall portion so as to surround an open space over the sleeve which is impregnated with oil and is constituted the sleeve-type bearing with an outer face of the shaft. The peripheral wall portions are accommodated in the open space over the sleeve. The annular recessed portion prevents oil from leaking out, and has a lower top of the most inner part. The lower end of the inner peripheral wall portion is located lower than the lower end of the outer peripheral wall portion, and the lower end of the outer peripheral wall portion is located lower than the lower top of the annular recessed portion.

Even if lubrication oil oozes from the sleeve to go along an inside wall of the motor from an outer peripheral face of the shaft, movement of the lubrication oil is blocked by the peripheral wall portions. The lubrication oil is pushed out by a centrifugal force to be accumulated on the lower end faces or tops of the peripheral wall portions, and when the accumulated lubrication oil reached a predetermined amount or more, the lubrication oil is scattered from the lower end faces or tops by a centrifugal force caused by rotor rotation. Since the lower end face or top of the inner peripheral wall portion is positioned below the lower end face or top of the outer peripheral wall portion, lubrication oil scattered from the inner peripheral wall portion is hardly adhered to the outer peripheral wall portion because the scattering oil flies along the radial direction which is the same direction as that of the centrifugal force generating, and then it is captured on the annular recessed portion. Even if a lubrication oil remaining on the inner peripheral wall portion without being scattered reaches an inner face of the outer peripheral wall portion, it is held on the inner face of the outer peripheral wall portion , so that movement of the lubrication oil is blocked like the inner peripheral wall portion, or the lubrication oil is scattered onto the annular recessed portion. The lubrication oil becomes difficult to reach the outside of the motor due to such plural holding and scattering actions, so that a motor where lubrication oil hardly leaks can be realized.

In addition, when the area of the lower end face of the peripheral wall portion is made small, a retaining force of lubrication oil adhered on the lower end face becomes weak and the lubrication oil becomes easy to be scattered.

DETAILED DESCRIPTION

One embodiment of the present invention will be explained with reference to FIGS. 1 to 3.

Figure 1:
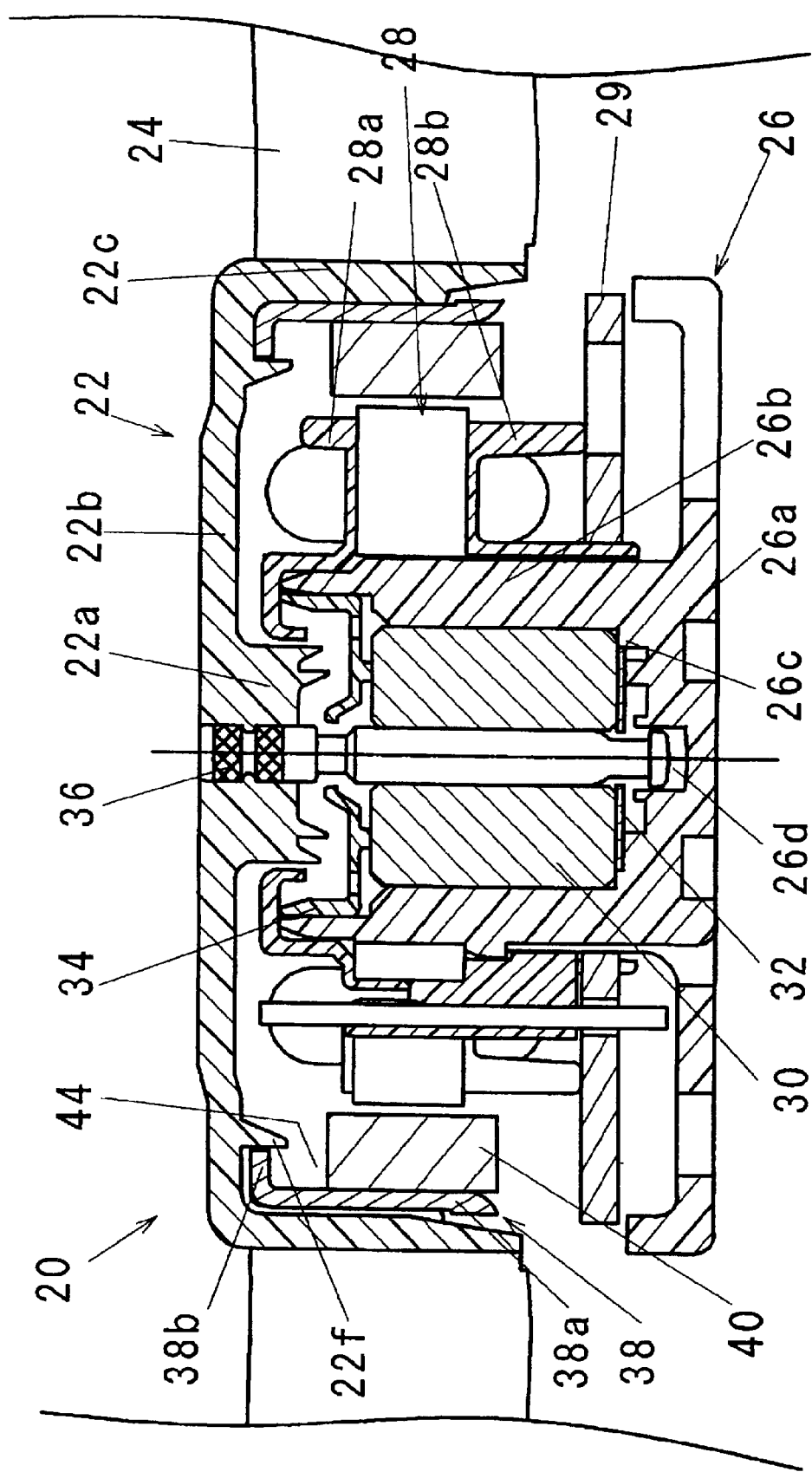
FIG. 1 is a sectional view of a motor of one embodiment of the present invention.

A motor 20 shown in FIG. 1 is a cooling fan motor where a rotor 22 is provided with an impeller 24. The motor 20 is provided with a housing 26 integrally made of synthetic resin and comprising a disc-shaped base portion 26a and a cylindrical bearing holding portion 26b with a bottom provided at a central portion of the base portion 26a. A stator 28 constituted by winding a winding coil on an iron core covered with a pair of insulators 28a and 28b for electrically insulating the iron core and the winding coil is fitted and fixed to an outer peripheral face of the bearing holding portion 26b. The winding coil is electrically connected to a circuit board 29 arranged below the stator 28.

A cylindrical sleeve 30 where porous metal has been impregnated with lubrication oil is fitted and fixed inside the bearing holding portion 26b by press-fit operation. A lower end face of the sleeve 30 abuts on a step portion 26c inside the bearing holding portion 26b of the housing 26, and also abuts on a thin annular member 32 put on a bottom face of the housing 26. Since the depth of the bearing holding portion 26b is sufficiently larger than the height of the sleeve 30, the bearing holding portion 26b extends above an upper end face of the sleeve 30. The upper end face of the sleeve 30 is pressed by a cap 34 press-fitted and fixed on an inner peripheral face of the bearing holding portion 26b. The cap 34 is made of synthetic resin and comprises a fitting portion 34a press-fitted in the bearing holding portion 26b of the housing 26 and a pressing portion 34b which presses the sleeve 30 side. The pressing portion 34b is formed with through-holes 34c which causes a space on the sleeve 30 side and an external space to communicate with each other. The cap 34 prevents the sleeve 30 from vibrating and prevents lubrication oil from being evaporated from the upper end face of the sleeve 30.

The sleeve 30 has a metal-made shaft 36 inserted at a central hole thereof such that it can be inserted in/pulled out of the central hole. When the shaft 36 slides on an inner peripheral face of the central hole of the sleeve 30, oil oozes from the inner peripheral face of the central hole, so that the shaft 36 is rotatably supported by the sleeve 30 while reducing frictional resistance between the sleeve 30 and the shaft 36. Accordingly, a sleeve-type bearing is formed between the sleeve 30 and the shaft 36. A lower end portion of the shaft 36 is inserted into a recess 26d provided on a bottom face of the bearing holding portion 26a of the housing 26.

The shaft 36 is provided at its upper end side with a rotor 22. The rotor 22 is integrally formed of synthetic resin and comprises a boss portion 22a coupled to the shaft 36, a disc-shaped portion 22b expanding in a radial direction about the boss portion 22a, a cylindrical portion 22c provided on an outer peripheral end of the disc-shaped portion 22b, and the impeller 24 provided on an outer peripheral face of the cylindrical portion 22c with a plurality of blades.

A magnet 40 is fitted and fixed in an inner peripheral face of the cylindrical portion 22c via a back iron 38. The magnet 40 is fixed in the back iron 38 with adhesive. The magnet 40 is cylindrical and is magnetized in multi-pole manner along a circumferential direction thereof. The back iron 38 is made of magnetic metal, and it comprises a cylindrical portion 38a fitted and fixed to an inner peripheral face of the cylindrical portion 22c of the rotor 22 and a cover portion 38b extending from an upper end of the cylindrical portion 38a so as to cover an upper end face of the magnet 40 with a predetermined gap between the upper end face of the magnet 40 and the cover portion 38b. The magnet 40 and the stator 28 are arranged so as to be opposed to each other in a radial direction. When electric current is supplied to the winding coil of the stator 28, magnetic field is induced, so that a rotor assembly comprising the rotor 22, the shaft 36, the back iron 38, and the magnet 40 rotates due to magnetic interaction between the magnetic field and the magnetic flux of the magnet 40. Accordingly, the magnet 40 and the stator 28 constitute a driving mechanism.

The rotor assembly is balanced in a vertical direction held by magnetic attraction force acting between the magnet 40 and the stator 28. Therefore, the lower end portion of the shaft 36 is inserted into the recess 26d of the housing 26 in a non-contacting state therewith. Such a constitution is employed that a diameter-reduced portion of the lower end portion of the shaft 36 is fitted in the central portion of the annular member 32 such that, even if a force exceeding the magnetic attracting force acts on the rotor assembly upwardly, the shaft 36 does not come out of the sleeve 30.

Figure 2:
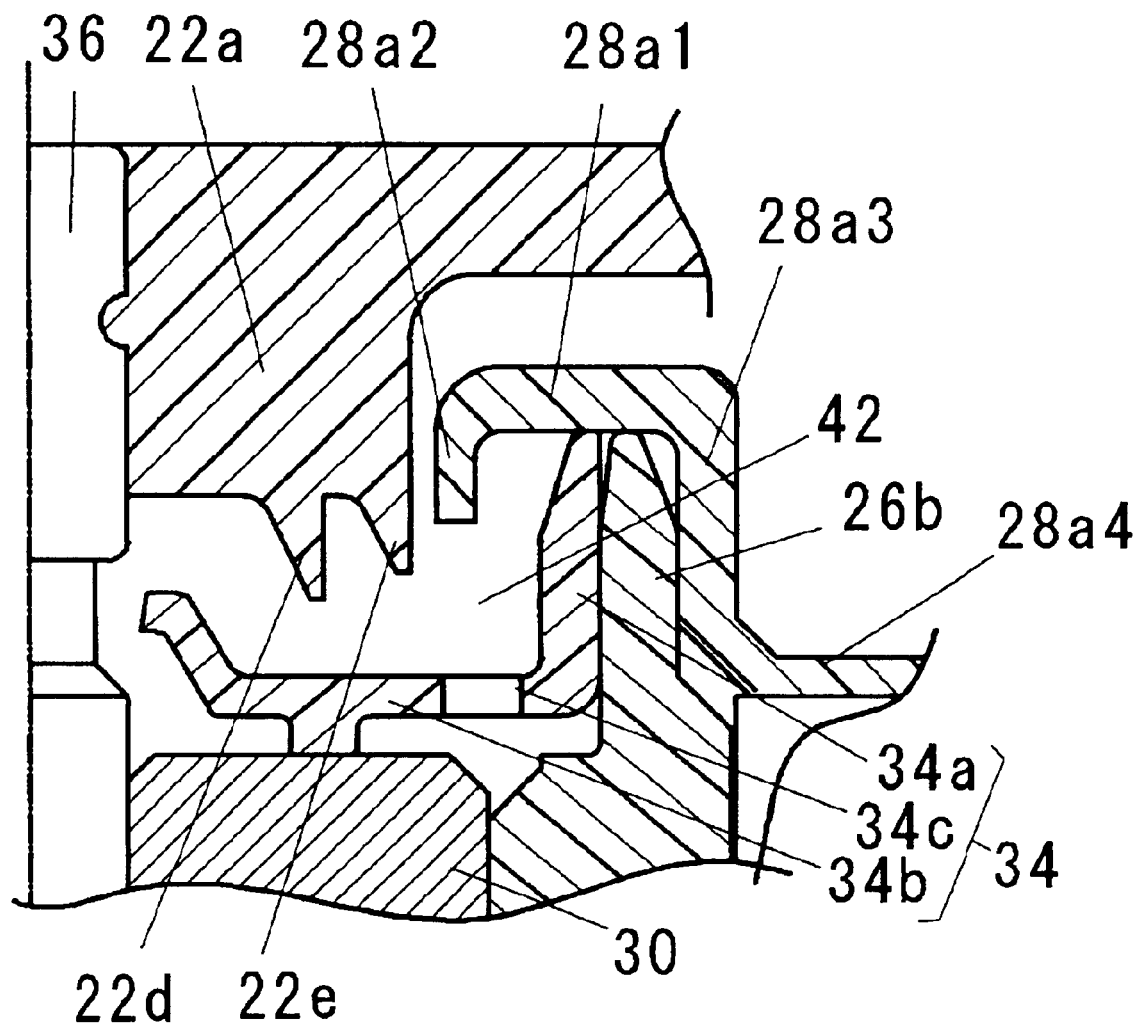
FIG. 2 is a sectional view of a main portion of the motor shown in FIG. 1.
Figure 3:
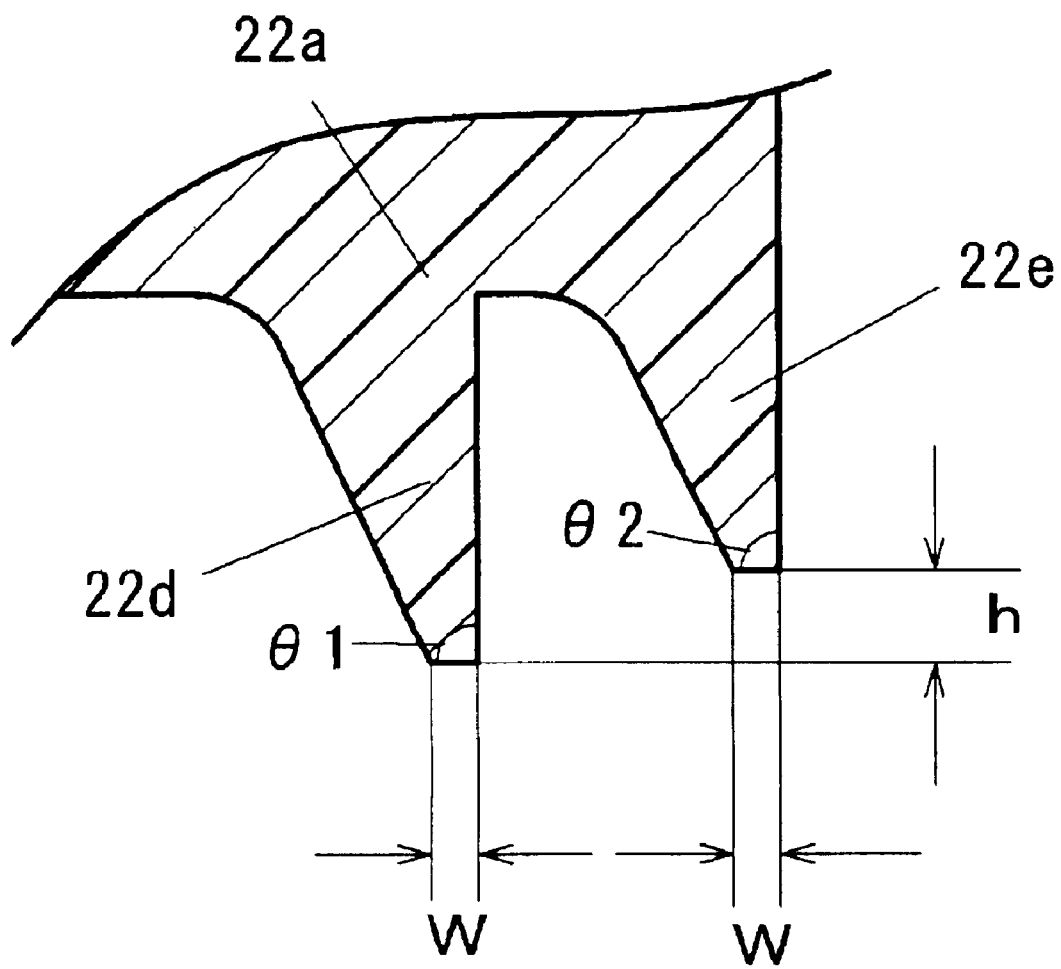
FIG. 3 is a sectional view of a main portion of the motor shown in FIG. 2.

As shown in FIG. 2, the boss portion 22a of the rotor 22 has a shape to surround a periphery of the upper end portion of the shaft 36. The boss portion 22a has a lower face opposed to the upper end face of the sleeve 30 and is positioned below the upper face of the bearing holding portion 26b of the housing 26. An outer peripheral face of the boss portion 22a is positioned on an inner side from the inner peripheral face of the bearing holding portion 26b of the housing 26. Further, the insulator 28a of the stator 28 has an inverse U-shape in cross section, and is comprised of a toric portion 28a1, an inner hanging portion 28a2 hanging down from an inner annular edge of the toric portion 28a1 toward the sleeve 30, an outer supporting portion 28a3 extending downward from an outer annular edge of the toric portion 28a1 and is fixed to the bearing holding portion 26b, and a cover portion 28a4 with the core of the stator 28. An inverse U-shaped portion comprising the toric portion 28a1, the inner hanging portion 28a2 and the outer supporting portion 28a3 covers the whole peripheries of the upper end portion of the bearing holding portion 26b and the fitted portion 34a of the cap 34. The inner hanging portion 28a1 is positioned in the bearing holding portion 26b. The lower end face of the inner hanging portion 28a1 is positioned below the upper end face of the bearing holding portion 26b. That is, the lower end portion of the boss portion 22a is positioned in an annular recessed portion 42 which is located in an outer peripheral location of the boss portion 22a so as to surround an open space over the sleeve 30. Two peripheral wall portions (hereinafter, a peripheral wall portion of the two peripheral wall portions which is positioned on an inner diametrical side is called an inner peripheral wall portion 22d and a peripheral wall portion thereof on an outer diametrical side is called as an outer peripheral wall portion 22e) which surround the shaft 36 with a gap therebetween in a radial direction are formed on the lower end face of the boss portion 22a hang downwardly from the lower end face of the boss portion 22a toward the upper end of the sleeve 30. The inner and outer peripheral wall portions 22*d*, 22*e* are accommodated in the annular recessed portion 42. The inner and outer peripheral wall portions 22*d*, 22*e* each have a lower end portion formed in an acute angle by an inner peripheral face gradually expanding down to its lower end downwardly and an outer peripheral face with an equal diameter. That is, each of the inner and outer peripheral wall portions 22*d*, 22*e* is formed such that its thickness in the radial direction becomes gradually small downwardly and it lower end portion has the minimum thickness. As shown in FIG. 3, the lower end faces of the inner and outer peripheral wall portions 22*d*, 22*e* are formed so as have flat faces with a fine width w (about 0.1 mm in this embodiment) perpendicular to a rotational axis of the motor. The lower end face of the inner peripheral wall portion 22*d* is positioned below the lower end face of the outer peripheral wall portion 22*e* by a height h (about 0.2 mm in this embodiment).

When lubrication oil oozes from the sleeve-type bearing 30 to go along an outer peripheral face of the shaft 36 and reach the lower end face of the boss portion 22*a* during rotation of the fan motor, the lubrication oil is held on the inner peripheral face of the inner peripheral portion 22*d* so that the lubrication oil is prevented from moving outside the rotor 22. Then, the lubrication oil is pushed out by a centrifugal force during the rotation to move downward of the inner peripheral wall portion 22*d* and reach the lower end portion thereof. When the lubrication oil gradually becomes large on the lower end face of the inner peripheral portion 22*d* and the amount thereof reaches a predetermined amount, the lubrication oil scatters. While the revolution per minute of the fan motor according to this embodiment is fast such as in a range of 2000 rpm to 3500 rpm, the lubrication oil is scattered in fine granular shape. Therefore, scattering of the lubrication oil entirely depends on a centrifugal force, where the gravity does not influence the scattering. Accordingly, the lubrication oil scattered from the lower end face of the inner peripheral wall portion 22*d* is scattered in a direction of a centrifugal force during the rotation. Since the lower end face of the inner peripheral wall portion 22*d* is disposed below the lower end face of the outer peripheral wall portion 22*e*, it is seldom that the lubrication oil scattered is adhered to the outer peripheral wall portion 22*e*, and it is captured in the annular recessed portion 42. That is, the lubrication oil is held on the inner peripheral wall portion 22*d* or it is scattered, so that possibility of lubrication oil leakage to the outside of the rotor 22 can be reduced.

If the lubrication oil remains without being scattered from the inner peripheral wall portion 22*d*, the lubrication oil is held an the lower end face of the coupling portion 22*a* and the inner peripheral face of the outer peripheral wall portion 22*e*, so that it is blocked from movement to the outside of the rotor 22.

On the other hand, when the lubrication oil held here moved downward along the outer peripheral wall portion 22*e* to reach the lower end face thereof, the lubrication oil is scattered just laterally on the lower end face of the outer peripheral wall portion 22*e* entirely due to a centrifugal force during rotation. Since the outer peripheral wall portion 22*e* faces the annular recessed portion 42 upwardly like the inner peripheral wall portion 22*d* such that the lower end face of the outer peripheral wall portion 22*e* is positioned below the lower end face of the inner hanging portion 28*a*2 of the insulator 28*a* constituting the annular recessed portion 42, the lubrication oil scattered is captured in the annular recessed portion 42. That is, the lubrication oil is held on the outer peripheral wall portion 22*e* or it is scattered, so that possibility of lubrication oil leakage to the outside of the rotor 22 can be reduced.

The lubrication oil scattered from the inner and outer peripheral wall portions 22*d*, 22*e* into the annular recessed portion 42 adheres on a surface of the cap 34 to be captured into the annular recessed portion 42, but a portion thereof returns back to sleeve 30 through the through-hole 34*c* of the cap 34. Further, lubrication oil adhered on an upper face of the cap 34 is prevented from going along the upper face of the cap 34 to leak outside, because the U-shaped portion of the insulator 28*a* covers the upper end portion of the bearing holding portion 26*b* of the housing 26 and the entire periphery of the inner peripheral face of the fitting portion 34*a* of the cap 34.

As the lower end portions of the inner and outer peripheral portions 22*d*, 22*e* are formed in an acute angle, the following merits or advantages can be obtained. A first merit lies in that, since areas of the lower end faces of both the peripheral wall portions 22*d*, 22*e* become small, holding forces of the lubrication oils which have reached the lower end faces to the lower end faces of both the peripheral wall portions 22*d*, 22*e* are apt to become smaller than centrifugal forces acting on the held lubrication oils. That is, when the centrifugal forces become smaller than the holding forces, the lubrication oils are released from both the peripheral wall portions 22*d*, 22*e*, so that both the peripheral wall portions 22*d*, 22*e* easily scatters the lubrication oils from the lower end portions thereof. In particular, since the outer peripheral faces of the inner and outer peripheral wall portions 22*d*, 22*e* are parallel to the rotational axial line, the lubrication oil hardly adheres to the outer peripheral faces when the lubrication oil scatters, which results in excellent oil releasability. As shown in FIG. 3, desirably, an angle θ1 between the outer peripheral face and the lower end face in the inner peripheral wall portion 22*d*, and an angle θ2 between the outer peripheral face and the lower end face in the outer peripheral wall portion 22*e* are 90 or less degree.

A second merit lies in that, when the rotor 22 is injection-molded, a molded product (rotor) is easily taken out of a mold. In this embodiment, as the lower end portions of both the peripheral wall portions 22*d*, 22*e* are flat, angles thereof are not completely acute, which is due to molding convenience. An effect or merit similar to an acute angle can be obtained even in such a shape.

Thus, lubrication oil can be prevented from moving to the outside of the rotor 22 by the inner peripheral wall portion 22*d* with a certain probability. In addition thereto, lubrication oil can be prevented from moving to the outside of the rotor 22 even by the outer peripheral wall portion 22*e* with a certain probability. A motor where lubrication oil is hard to leak due to interaction between both the peripheral wall portions 22*d*, 22*e* can be realized.

Leakage of lubrication oil can be sufficiently prevented by the inner and outer peripheral wall portions 22*d*, 22*e* of the boss portion 22*a*. However, in order to improve further reliability to lubrication oil leakage, a hanging portion 22*f* facing or extending in the annular space 44 defined by the upper end face of the magnet 40, the lower face of the cover portion 38*b* of the back iron 38*a* and the inner peripheral face of the cylindrical portion 38*a* may be provided in an annular shape on the lower face of the disc-like portion 22*b* of the rotor 22. The hanging portion 22*f* is formed such that its inner peripheral face gradually expands downwardly and its lower end portion has an acute angle. Even if lubrication oil goes from the outer peripheral face of the boss portion 22*a* along the lower face of the disc-shaped portion 22*b* of the rotor 22 toward the outside of the rotor 22, the lubrication oil scatters from the lower end portion of the hanging portion 22*f* to be captured into the annular space 44, thereby preventing lubrication oil from leaking outside the rotor 22. Since there is the adhesive between the back iron 38 and the magnet 40, the lubrication oil in the annular space 44 can be prevented from moving to the outside of the rotor 22 through a clearance between the back iron 38 and the magnet 40.

Incidentally, lubrication oil seldom reaches the outer peripheral face of the boss portion 22a due to the inner and outer peripheral wall portions 22d, 22e, but a motor where lubrication oil is much hard to leak owing to addition of the hanging portion 22f can be obtained.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

Figure 4:
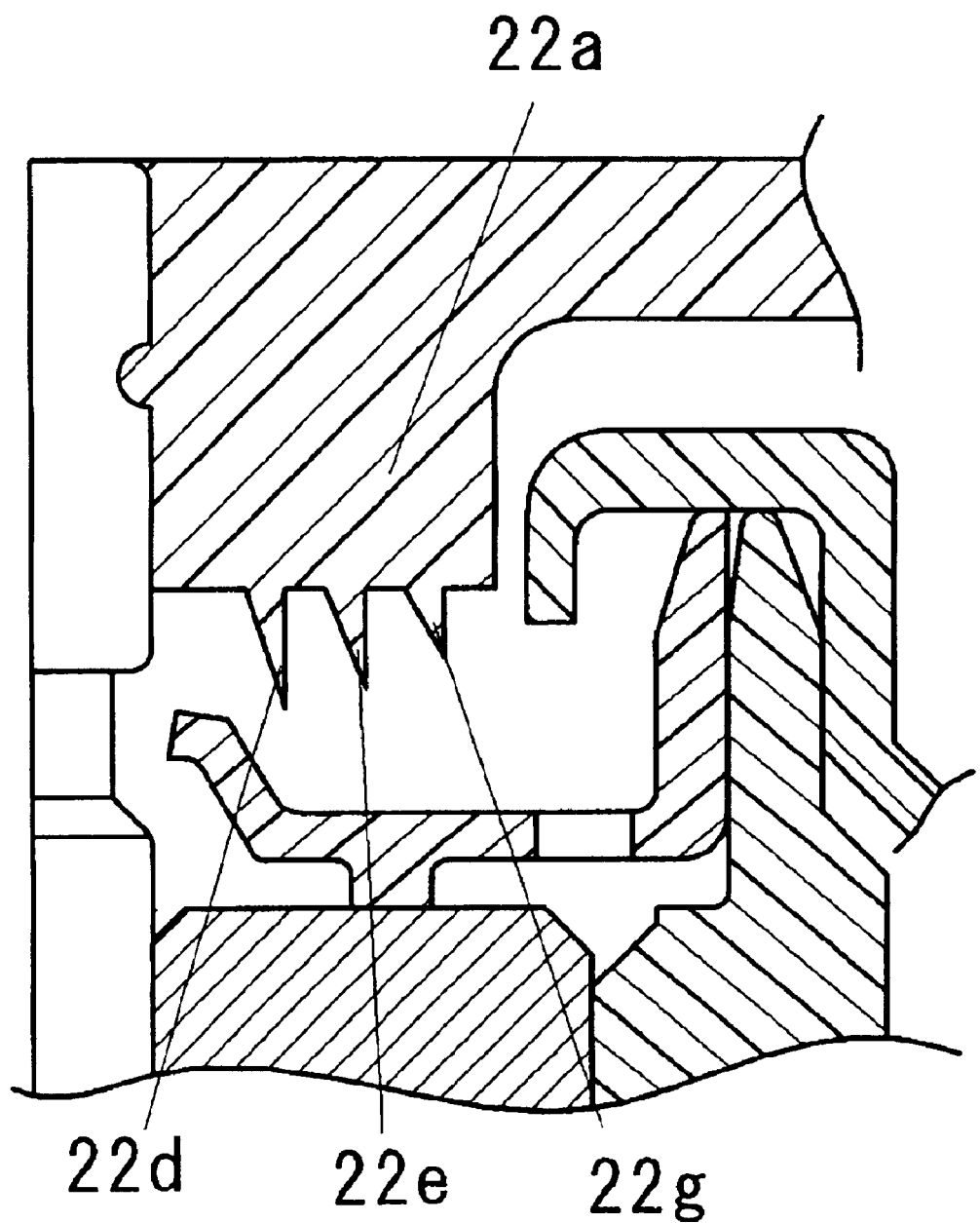
FIG. 4 is a sectional view of a main portion of a motor of a modified embodiment of the embodiment shown in FIG. 1.

For example, the boss portion 22a in the motor shown in FIG. 1 is constituted so as to have two peripheral wall portions 22d, 22e, but such a constitution may be employed that a peripheral wall portion 22g is added and the boss portion 22a has three peripheral wall portions, as shown in FIG. 4. Four or more peripheral wall portions may be provided if they can be disposed in the annular recessed portion 42, of course.

Figure 5:
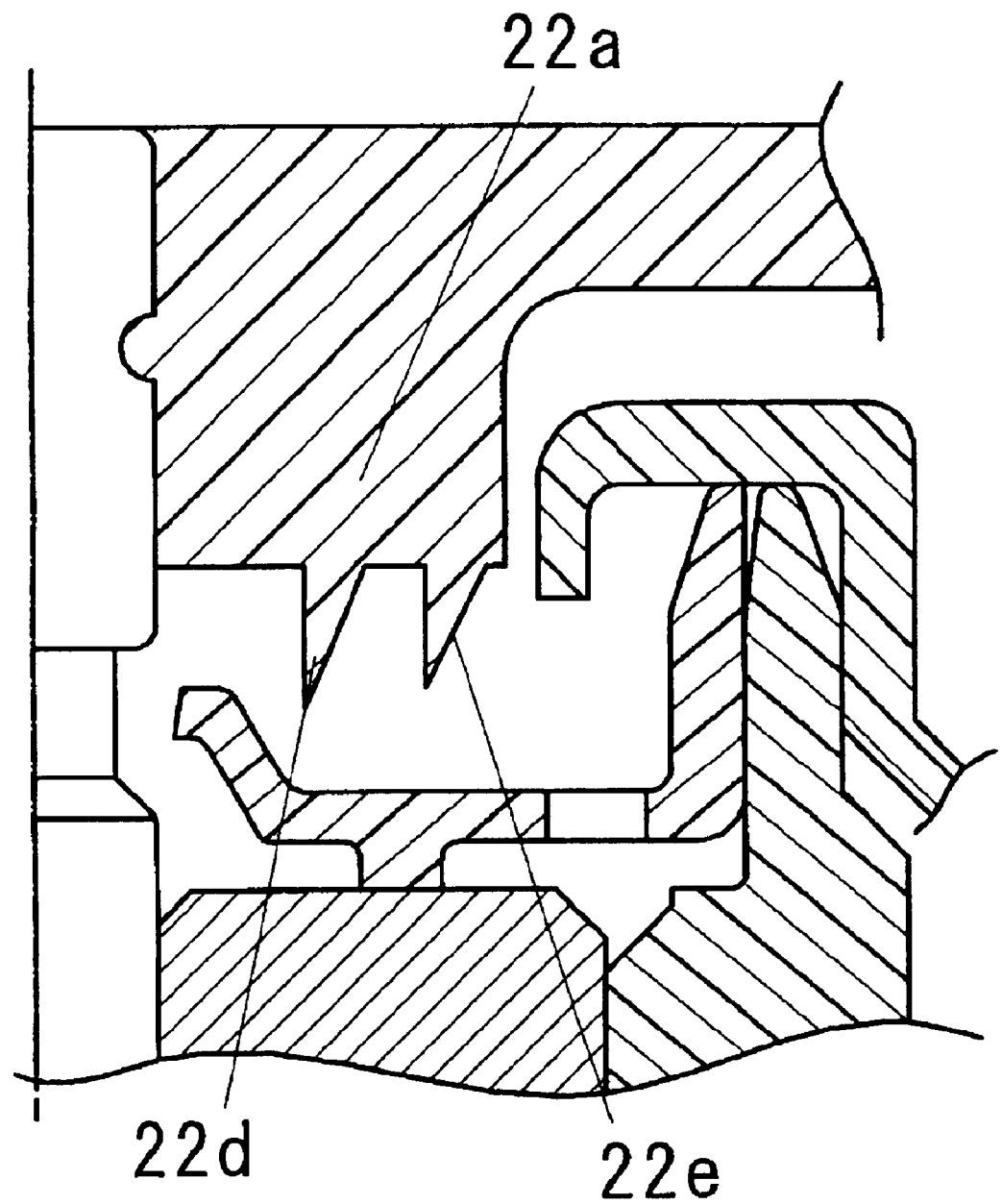
FIG. 5 is a sectional view of a main portion of a motor of another modified embodiment of the embodiment shown in FIG. 1.
Figure 6:
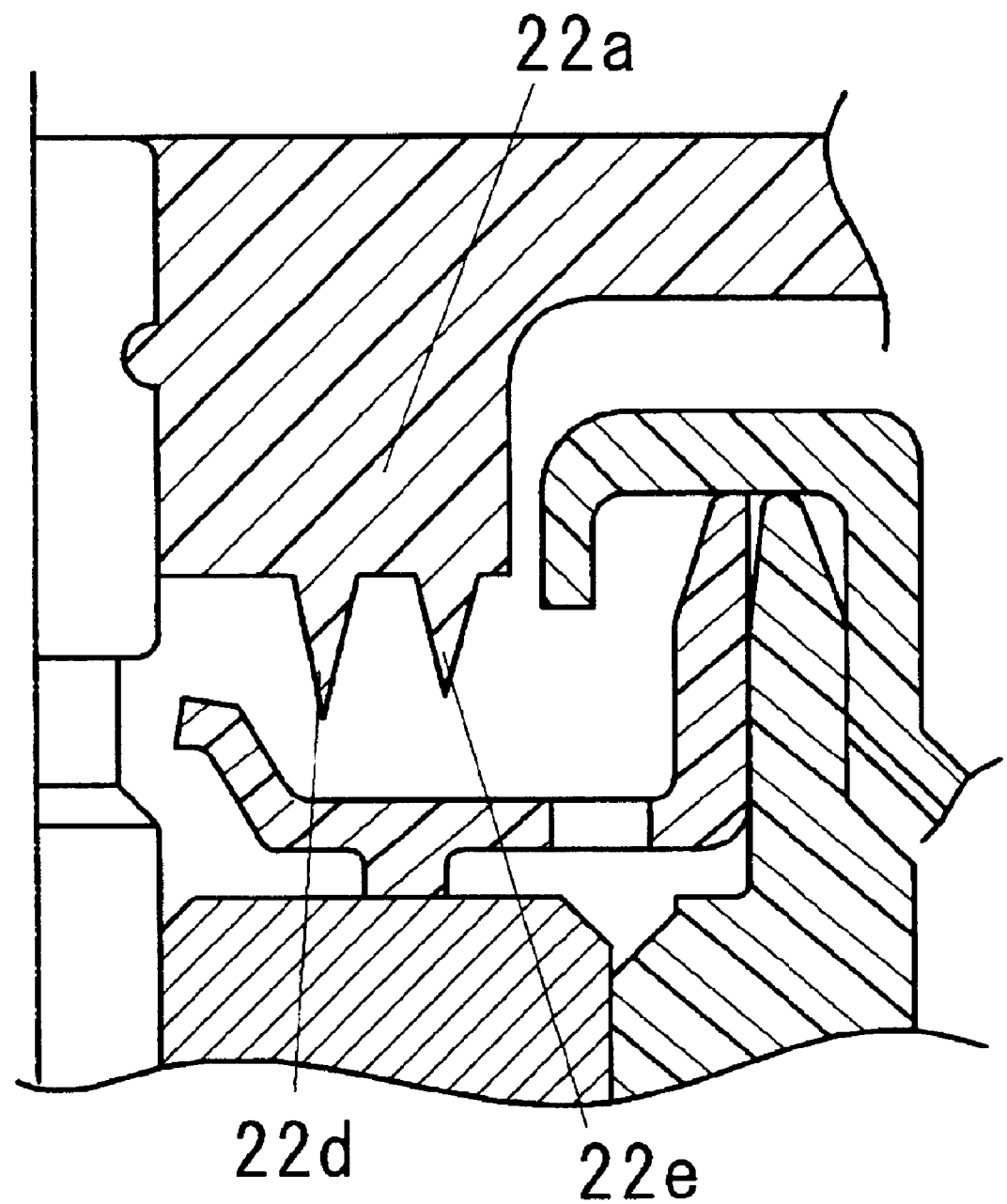
FIG. 6 is a sectional view of a main portion of a motor of another modified embodiment of the embodiment shown in FIG. 1.

The inner and outer peripheral wall portions 22d, 22e in the motor shown in FIG. 1 are constituted such that their inner peripheral faces gradually expand downwardly and their lower end portions become acute. However, such a constitution may be employed that the outer peripheral faces gradually expand downwardly, as shown in FIG. 5, or that both faces of the inner peripheral faces and the outer peripheral faces gradually expand downwardly, as shown in FIG. 6.

Figure 7:
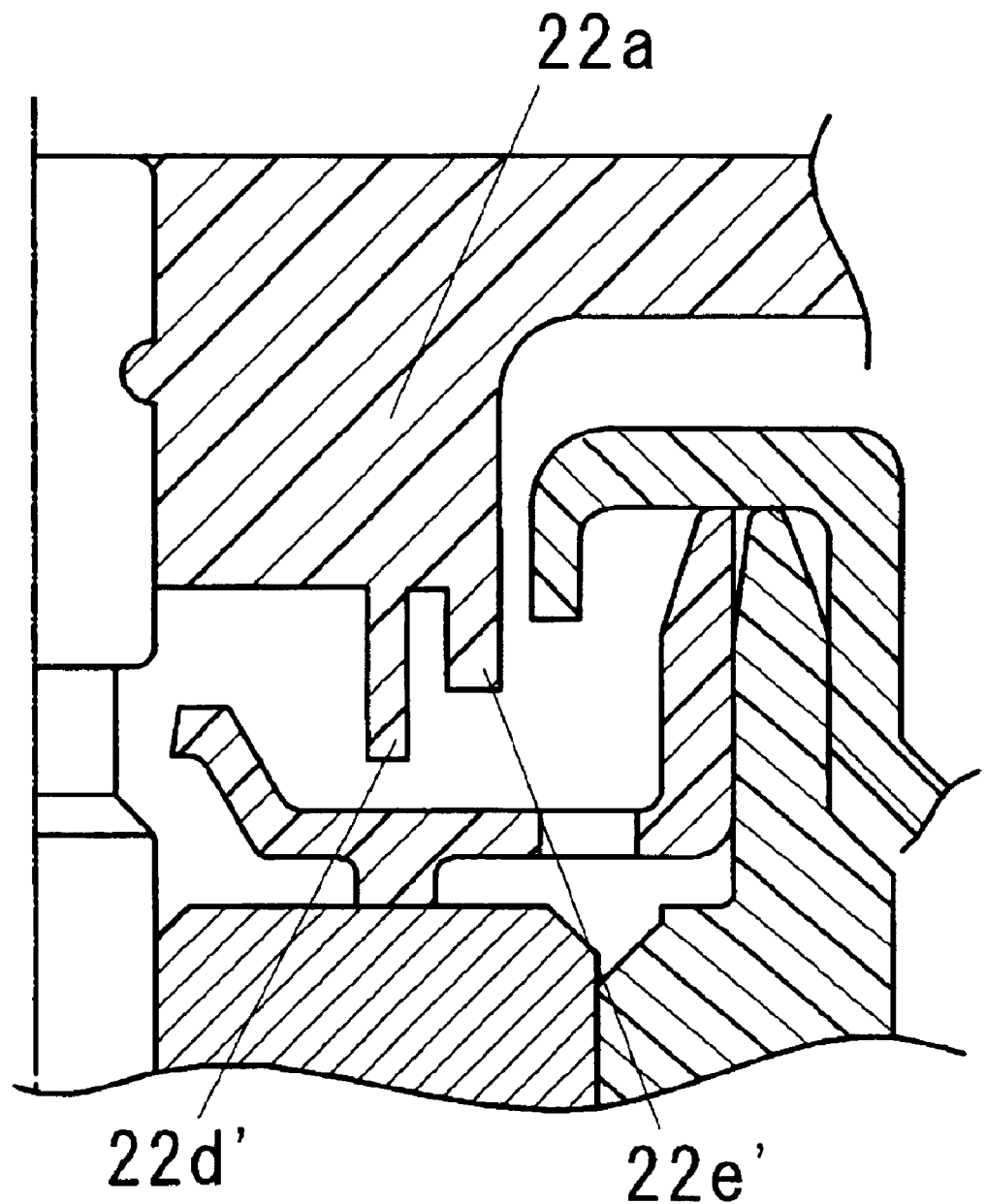
FIG. 7 is a sectional view of a main portion of a motor of another modified embodiment of the embodiment shown in FIG. 1.

The peripheral wall portions 22d, 22e, 22g described above are constituted such that all their lower end portions become acute. However, the lower end portions of the peripheral wall portions 22d", 22e" may be constituted to be rectangular, as shown in FIG. 7.

Figure 8:
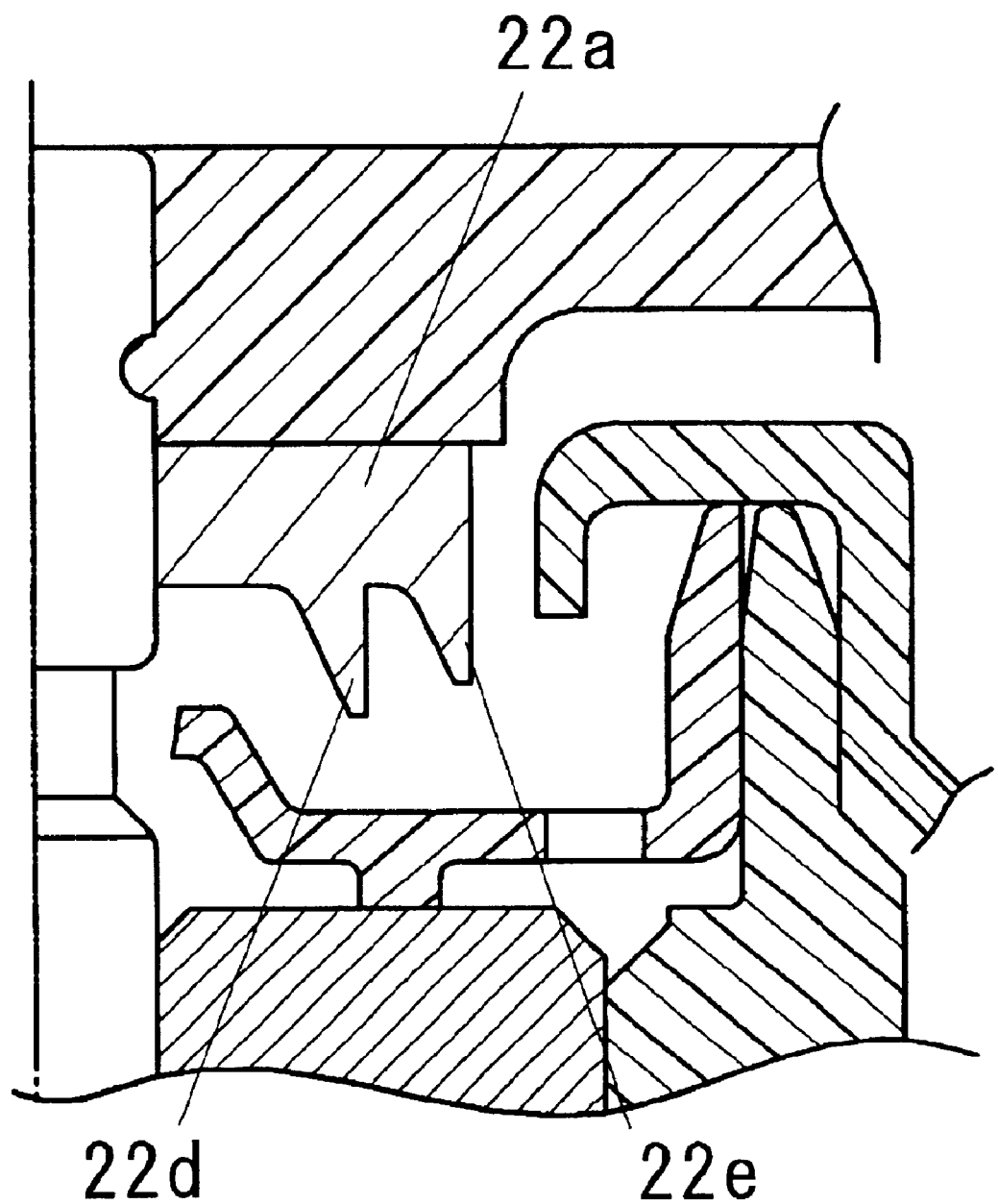
FIG. 8 is a sectional view of a main portion of a motor of another modified embodiment of the embodiment shown in FIG. 1.
Figure 9:
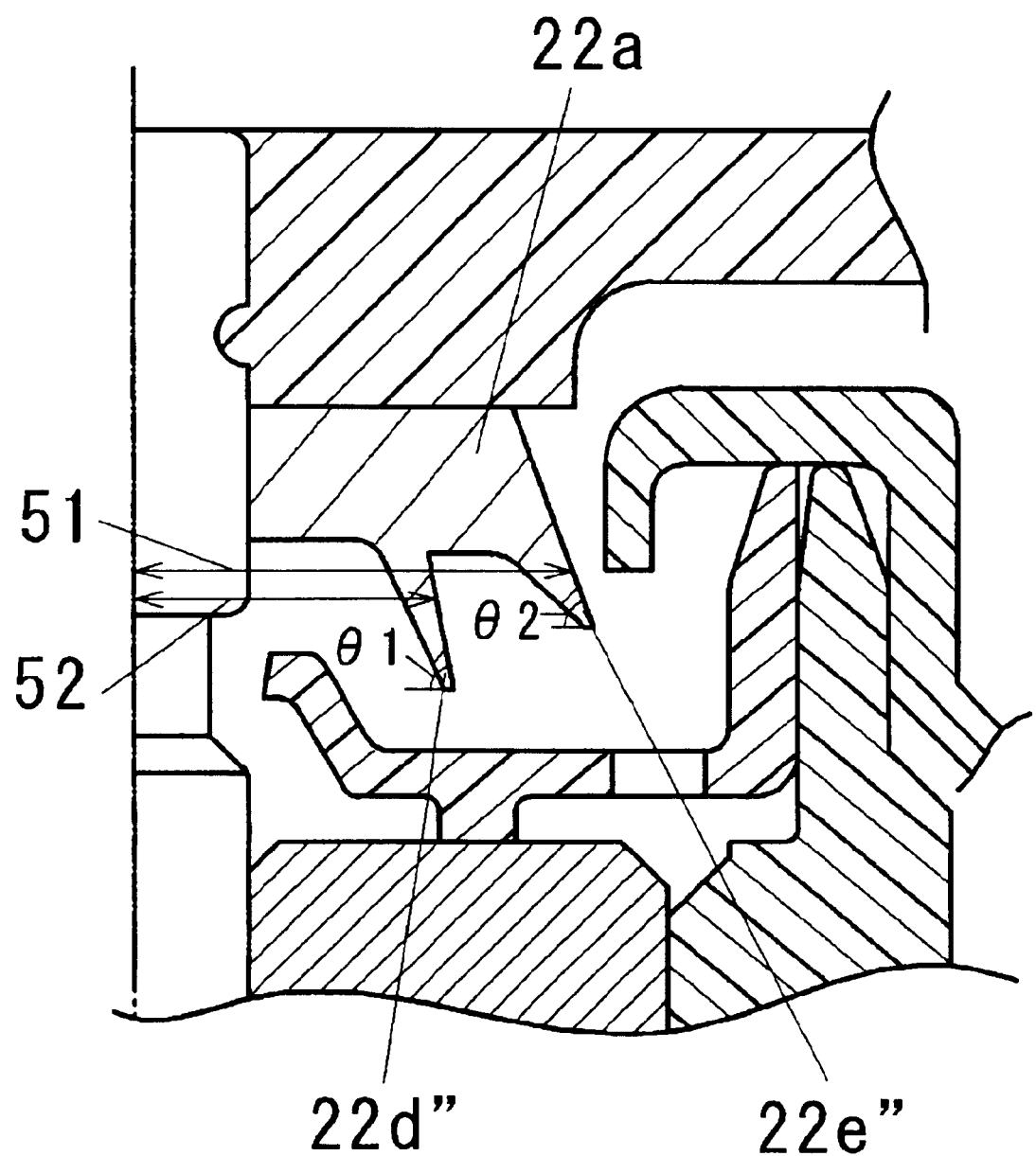
FIG. 9 is a sectional view of a main portion of a motor of another modified embodiment of the embodiment shown in FIG. 1.
Figure 10:
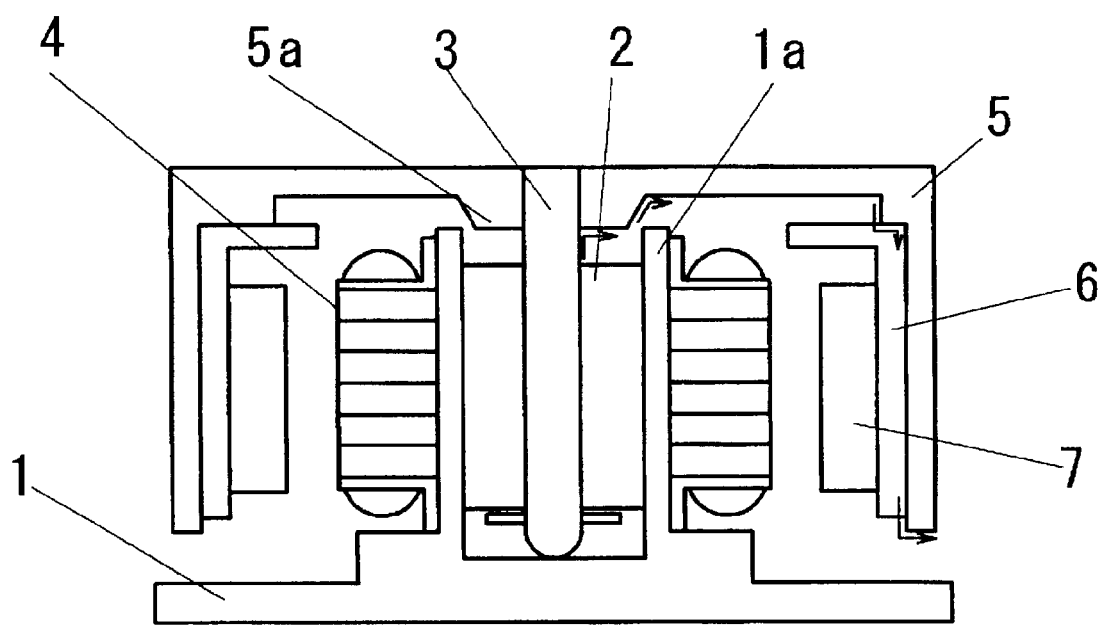
FIG. 10 is a sectional view of a conventional motor.
Figure 11:
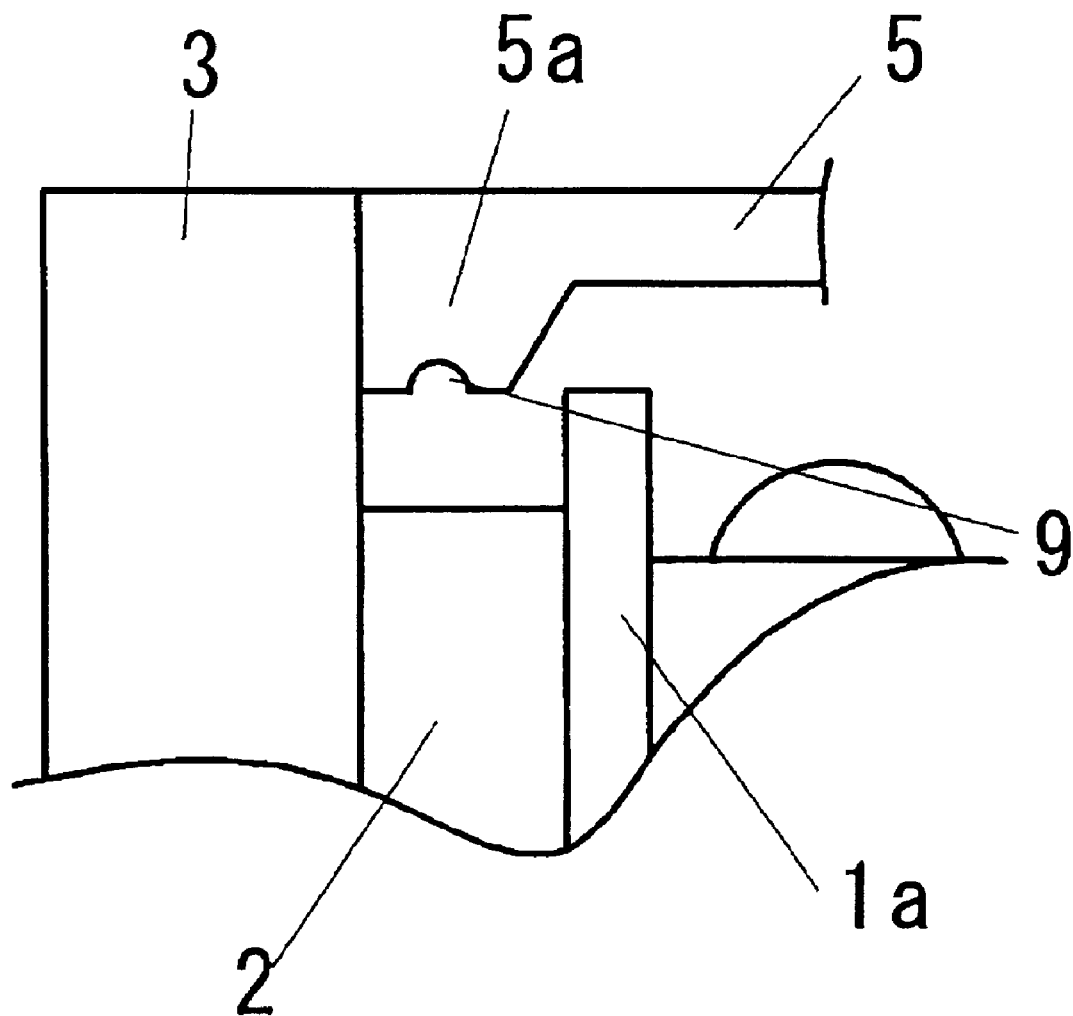
FIG. 11 is a sectional view of a main portion of another conventional motor.

The peripheral wall portions 22d, 22e, 22g described above are constituted such that they are provided integrally on the rotor 22. However, such a constitution may be employed that only the peripheral wall portions are provided on the boss portion 22a which is formed as a separate member, as shown in FIG. 8. When the respective peripheral wall portions are integrally provided on the rotor 22, such a shape must be employed for the boss portion that a molded product can be released from a mold at a time of molding. When the boss portion 22a is formed as the separate member, as shown in FIG. 8, such a constraint for the molding time is not requires. Therefore, as shown in FIG. 9, the outer peripheral face of the peripheral wall portion can be formed in a face which a distance 51,52 from an observing point on the outer peripherals of peripheral wall portions 22d, 22e to the rotational axis is gradually getting longer depending on the observing point going downwardly. In other word, the angle θ1, θ2 is less than 90 degree. Lubrication oil is scattered more easily from such peripheral wall portions 22d, 22e.

Though the motor shown in FIG. 1 is a cooling fan motor, the present invention can be applied to a motor used for another application, for example, such as a driving motor for driving a recording disc on which data has been recorded.

Though the inverse U-shaped portion of the insulator 28a is provided integrally on the insulator 28a, the inverse U-shaped portion can be formed integrally on the bearing holding portion 26b, or be formed as a separate member.

What is claimed is:

1. A motor comprising:
   a column-shaped shaft extending in a vertical direction;
   a sleeve impregnated with oil, which is cylindrical and rotatably supports the shaft therein, a sleeve-type bearing being formed between the shaft and the sleeve;
   a rotor provided with a disc-shaped portion expanding from an upper end portion of the shaft about the shaft, a cylindrical portion hanging downwardly from an outer peripheral edge of the disc-shaped portion, and at least two peripheral wall portions, an inner wall portion and an outer wall portion, which are hanging downwardly from the lower face of the disc-shaped portion toward the upper end of the sleeve about the shaft so as to surround the shaft, and are spaced from each other in a radial direction of the shaft;
   a housing having a cylindrical sleeve holding portion holding the sleeve inside thereof;
   a stator fixed outside of the sleeve holding portion;
   a cylindrical magnet which is fixed on the inner peripheral face of the cylindrical portion so as to be opposed to the stator for generating a rotational driving force in the rotor together with the stator; and
   an annular recessed portion located in an outer peripheral location of the outer wall portion so as to surround an open space over the sleeve, the open space in which the inner and the outer wall portion are accommodated, for preventing oil from leaking out, the annular recessed portion having a lower top of the most inner part,
   wherein
   the lower end of the inner wall portion is located lower than the lower end of the outer wall portion, and the lower end of the outer wall portion is located lower than the lower top of the annular recessed portion.

2. A motor according to claim 1, wherein
   the annular recessed portion which has an inverse U-shape in cross section, and comprises a toric portion, an inner hanging portion hanging down from an inner annular edge of the toric portion toward the sleeve, and an outer supporting portion extending downward from an outer annular edge of the toric portion and fixed to the stator or the housing.

3. A motor according to claim 2, wherein
   at least one of the peripheral wall portions has a shape that a thickness thereof in the radial direction gradually becomes smaller downwardly and becomes minimum at a lower end portion.

4. A motor according to claim 3, wherein
   at least one of the peripheral wall portions has an outer peripheral face which is parallel to a rotational axis of the motor, or a distance from an observing point on the outer peripheral face to the rotational axis is gradually getting longer depending on the observing point going downwardly.

5. A motor according to claim 3, wherein
   at least one of the peripheral wall portions has an outer peripheral face which a angle defined between the outer peripheral face and a face perpendicular to a rotational axis of the motor is 90 or less degree.

6. A motor according to claim 4, wherein
   the rotor is integrally moulded of synthetic resin.

7. A motor according to claim 6, further comprising a plurality of blades fixed to an outer peripheral face of the cylindrical portion.

8. A motor according to claim 7, further comprising a back iron including an outer cylindrical portion sandwiched between the magnet and the cylindrical portion of the rotor and a cover portion expanding toward an inner diametrical side with a predetermined clearance from an upper end face of the magnet, and formed of magnetic material, wherein the disc-shaped portion of the rotor has a hanging portion which surrounds the shaft with a clearance from the shaft in the radial direction about the shaft so as to face in an annular space defined by the upper end face of the magnet, the lower face of the cover portion of the back iron and the inner peripheral face of the outer cylindrical portion.

9. A motor according to claim 3, wherein in the rotor, the peripheral wall portions and the disc-shaped portion are made of different material each other.

* * * * *